(12) United States Patent
Guerzoni et al.

(10) Patent No.: US 10,912,141 B2
(45) Date of Patent: Feb. 2, 2021

(54) METHOD FOR ESTABLISHING A COMMUNICATION AND COMMUNICATION DEVICE

(71) Applicant: NTT DOCOMO, INC., Chiyoda-ku (JP)

(72) Inventors: Riccardo Guerzoni, Munich (DE); Jari Mutikainen, Munich (DE); Takashi Koshimizu, Chiyoda-ku (JP); Irfan Ali, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/339,647

(22) PCT Filed: Sep. 13, 2017

(86) PCT No.: PCT/EP2017/072993
§ 371 (c)(1),
(2) Date: Apr. 4, 2019

(87) PCT Pub. No.: WO2018/065181
PCT Pub. Date: Apr. 12, 2018

(65) Prior Publication Data
US 2019/0239271 A1  Aug. 1, 2019

(30) Foreign Application Priority Data
Oct. 5, 2016  (EP) .................................. 16192451

(51) Int. Cl.
*H04W 76/16*  (2018.01)
*H04W 76/18*  (2018.01)
(Continued)

(52) U.S. Cl.
CPC ......... *H04W 76/18* (2018.02); *H04L 65/1006* (2013.01); *H04L 65/1016* (2013.01);
(Continued)

(58) Field of Classification Search
CPC ......... H04W 36/0022; H04W 65/1006; H04W 65/1069; H04W 76/16; H04W 76/18; H04W 80/12
See application file for complete search history.

(56) References Cited

U.S. PATENT DOCUMENTS

2010/0303012 A1    12/2010  Atarius et al.
2013/0084860 A1*    4/2013  Wong .................... H04W 60/00
                                                        455/435.1
(Continued)

FOREIGN PATENT DOCUMENTS

JP    2012-517133 A    7/2012
JP    2015-228649 A   12/2015
(Continued)

OTHER PUBLICATIONS

"3rd Generation Partnership Project Technical Specifications Group Services and Systems Aspects Circuit Switched fallback in Evolved Packet Systems," Stage 2, Release 13, 3GPP TS.272. Jun. 2016 (Year: 2016).*
(Continued)

*Primary Examiner* — Brian P Cox
(74) *Attorney, Agent, or Firm* — Osha Bergman Watanabe & Burton LLP

(57) ABSTRACT

According to one embodiment, a method for establishing a communication is described comprising performing, over a first mobile radio communication network, a call control protocol message exchange indicating that a communication session establishment between a first communication device and a second communication device is intended; initiating a fallback by the first communication device from the first mobile radio communication network to a second mobile radio communication network, in reaction to a specific call control message of the call control protocol message exchange; performing the fallback and establishing the
(Continued)

communication session between the first communication device and the second communication device via the second mobile radio communication network.

13 Claims, 14 Drawing Sheets

(51) Int. Cl.
  *H04L 29/06* (2006.01)
  *H04W 36/00* (2009.01)
  *H04W 80/12* (2009.01)
(52) U.S. Cl.
  CPC ..... *H04L 65/1069* (2013.01); *H04W 36/0022* (2013.01); *H04W 76/16* (2018.02); *H04W 80/12* (2013.01)

(56) References Cited

U.S. PATENT DOCUMENTS

| | | | |
|---|---|---|---|
| 2014/0376360 A1* | 12/2014 | Lisak | H04L 49/557 370/218 |
| 2016/0029228 A1 | 1/2016 | Mufti | |
| 2016/0227447 A1* | 8/2016 | Hu | H04W 36/022 |
| 2018/0302834 A1* | 10/2018 | Zhang | H04W 36/38 |

FOREIGN PATENT DOCUMENTS

| | | |
|---|---|---|
| JP | 2016-513442 A | 5/2016 |
| WO | WO 2010/115045 A1 | 10/2010 |
| WO | WO 2016/014241 A1 | 1/2016 |
| WO | WO-2016014241 A1 * | 1/2016 ............ H04W 24/04 |

OTHER PUBLICATIONS

Japanese Office Action in corresponding Application No. 2017-550735 dated Aug. 27, 2019 (8 pages).
Extended European Search Report dated Mar. 29, 2017 in the corresponding European Application No. 16192451.9.
Japanese Office Action in corresponding Application No. 2017-550735 dated Apr. 9, 2019 (6 pages).
International Search Report and Written Opinion dated Dec. 6, 2017 in PCT/EP2017/072993 filed on Sep. 13, 2017.
Japanese Office Action dated Dec. 4, 2018 in Japanese Patent Application No. P2017-550735 (with unedited computer-generated English translation).
"3$^{rd}$ Generation Partnership Project; Technical Specification Group Services and System Aspects; Circuit Switched (CS) fallback in Evolved Packet System (EPS); Stage 2 (Release 13)", 3GPP TS 23.272 V13.4.0, Jun. 2016, pp. 1-103.
"3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 14)", 3GPP TS 23.401 V14.0.0, Jun. 2016, pp. 1-374.
"VoLTE Service Description and Implementation Guidelines Version 2.0", GSM Association, Oct. 7, 2014, pp. 1-175.
"3$^{rd}$ Generation Partnership Project; Technical Specification Group Services and System Aspects; IP Multimedia Subsystem (IMS) centralized services; Stage 2 (Release 14)", 3GPP TS 23.292 V14.0.0, Sep. 2016, pp. 1-137.
Office Action issued in Japanese Application No. 2017-550735; dated Mar. 17, 2020 (7 pages).
Office Action issued in Chinese Application No. 201780061162.8; dated Sep. 24, 2020 (16 pages).
Office Action issued in European Application No. 16192451.9; dated Nov. 9, 2020 (7 pages).

* cited by examiner

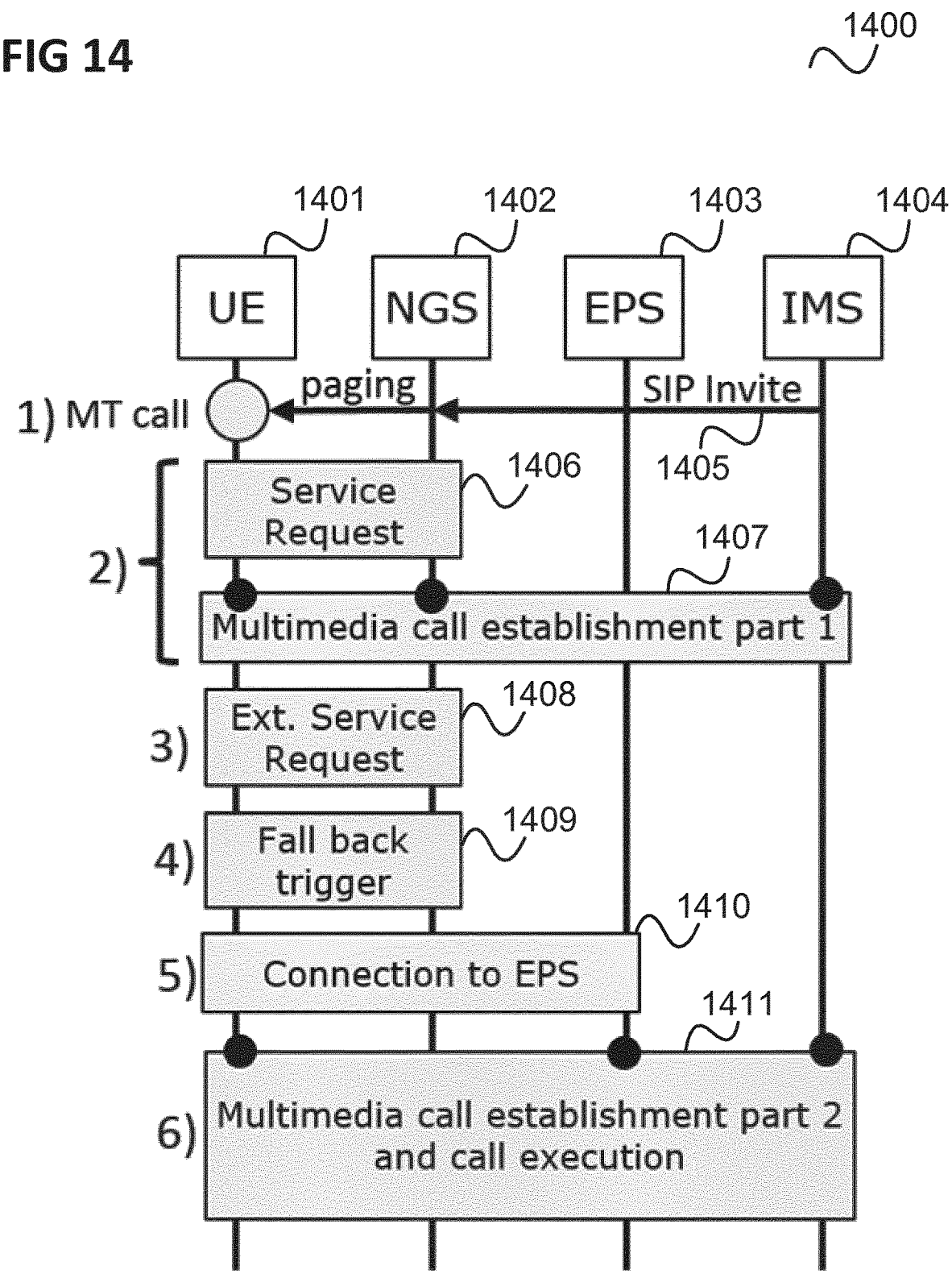

METHOD FOR ESTABLISHING A COMMUNICATION AND COMMUNICATION DEVICE

The present disclosure relates to methods for establishing a communication and communication devices.

In the initial stage of its deployment there may be issues with supporting multimedia services over a NGS (Next Generation System) for mobile communication. A main issue may be a discontinuous NR (New RAN) coverage, so that frequent handovers would be needed during voice/video calls. In particular, if handover from NR to LTE (Long Term Evolution) is not supported, service continuity may not be supported.

Other possible issues may be related to transitory deployment situations due to, e.g. not supported or not sufficiently tested
- RRC (Radio Resource Control) signalling options or QoS (Quality of Service) requirements related to multimedia services or
- Next Generation NAS (Non-Access Stratum) signalling options (e.g. emergency calls) related to multimedia services.

Accordingly, approaches to provide a reliable support of multimedia services in context of a next generation system are desirable.

According to one embodiment, a method for establishing a communication is provided comprising performing, over a first mobile radio communication network, a call control protocol message exchange indicating that a communication session establishment between a first communication device and a second communication device is intended, initiating a fallback by the first communication device from the first mobile radio communication network to a second mobile radio communication network in reaction to a specific call control message of the call control protocol message exchange, performing the fallback and establishing the communication session between the first communication device and the second communication device via the second mobile radio communication network.

According to a further embodiment, a communication device according to the above method for establishing a communication is provided.

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 14 shows a message flow diagram illustrating a method for establishing a mobile terminated multimedia call.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

With multiple mobile communication systems being deployed in the same geographic region, a mobile terminal may be within the coverage area of more than one mobile communication networks which may operate according to the same RAT (radio access technology) or according to different RATs. This is illustrated in FIG. 1.

Figure 1:
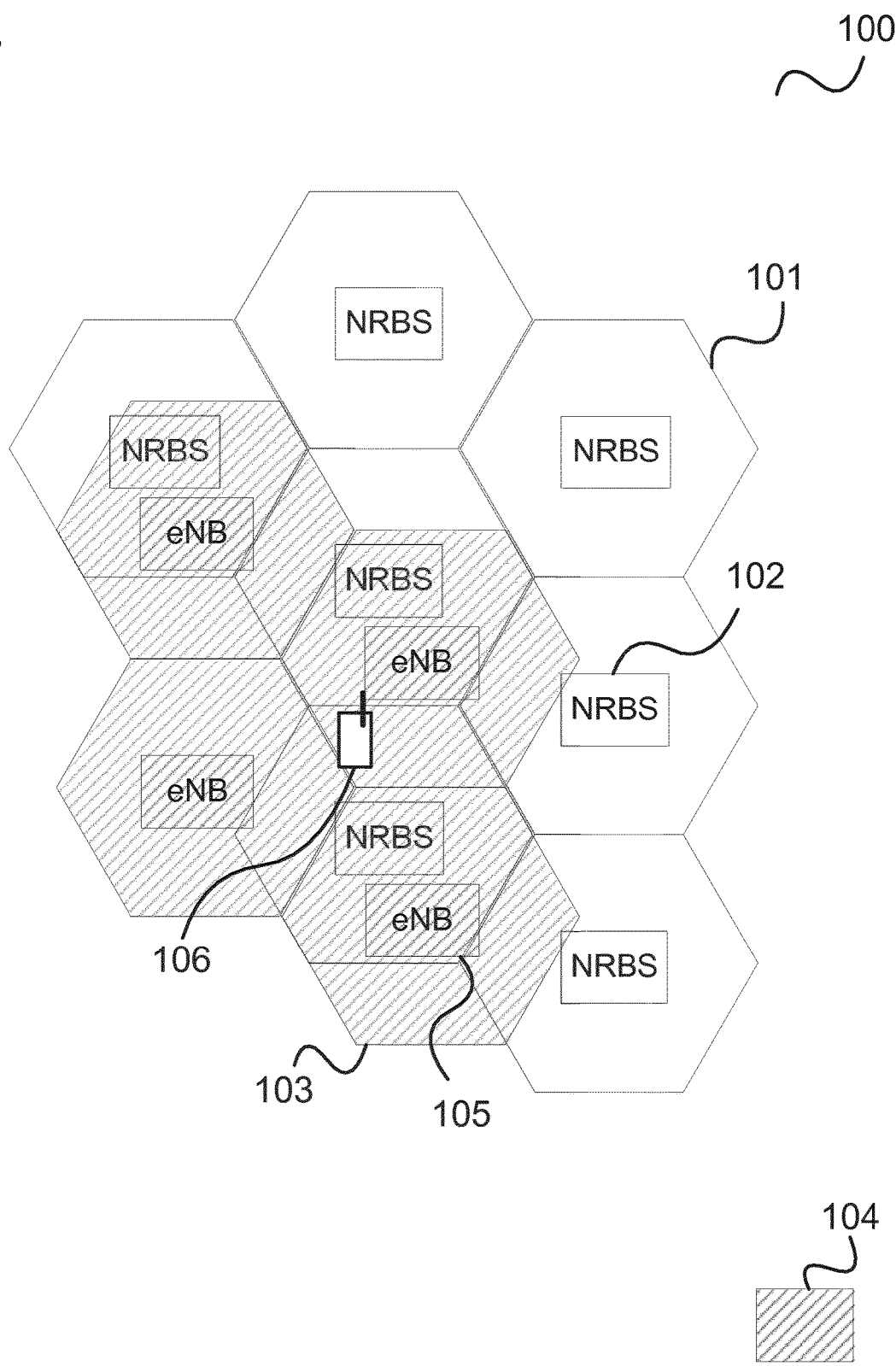
FIG. 1 shows a radio cell arrangement including two communication networks.

FIG. 1 shows a radio cell arrangement 100 including two communication networks.

The radio cell arrangement 100 includes a first plurality of radio cells 101 (shown without hatching) operated by a plurality of first base stations 102 of a first communication network (e.g. next generation radio base stations NRBS), and a second plurality of radio cells 103 indicated by a hatching 104 operated by a plurality of second base stations 105 of a second communication network (e.g. of a different RAT, e.g. LTE base stations eNB).

As illustrated, the second plurality of radio cells 103 overlaps the first plurality of radio cells 101 such that a mobile terminal 106, located in the overlapping area may use both the first communication network and the second communication network, e.g. may both register with a base station 102 of the first communication network and a base station 105 of the second communication network. In particular, the mobile terminal 106 may use the second communication network (e.g. LTE) as a fallback from the first communication network (e.g. Next Generation System). This is referred to as LTE Fallback which an operator of a Next Generation System (NGS) can initially (e.g. in the initial phase of deployment) introduce to support multimedia services over LTE while the NGS is still the target to provide PS (Packet Switched) related services.

Figure 2:
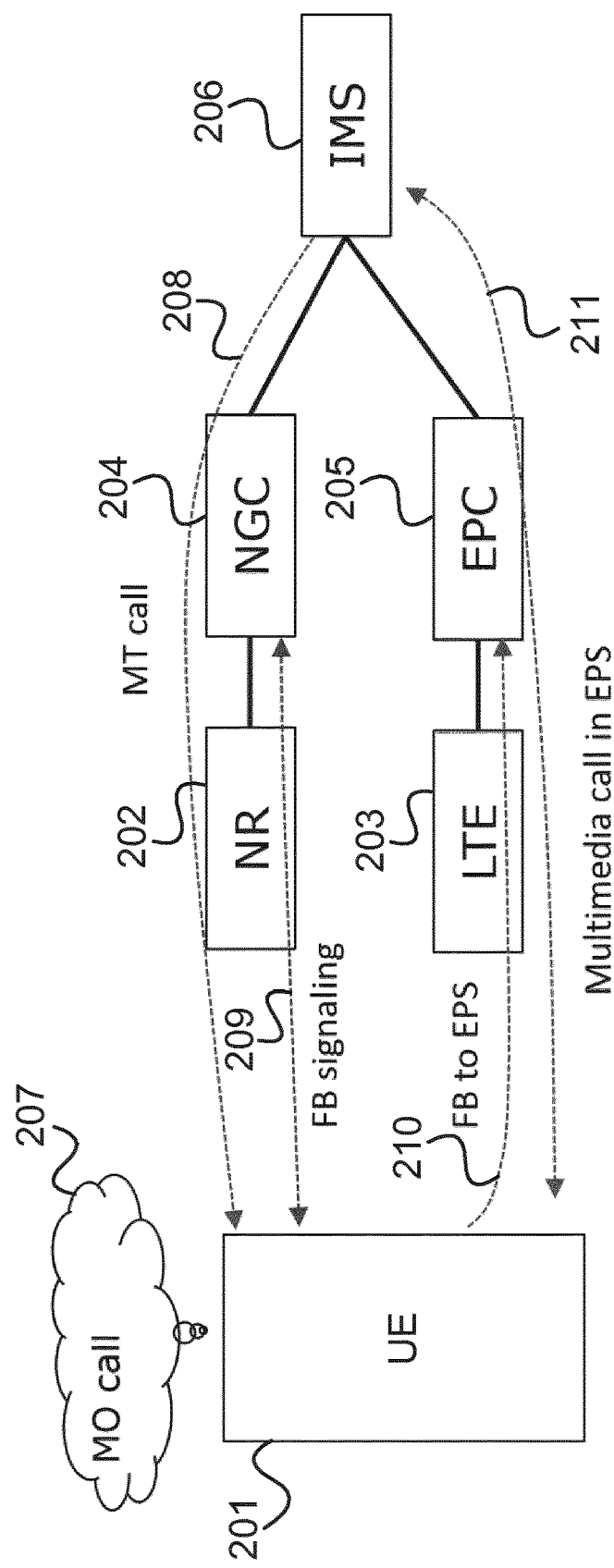
FIG. 2 illustrates an LTE Fallback.

FIG. 2 illustrates an LTE Fallback.

A UE 201, e.g. corresponding to mobile terminal 106, is within the coverage area of the Next Generation System radio access network 202, referred to as new radio (NR) 202, as well as an LTE radio access network (LTE RAN) 203, i.e. an E-UTRAN (Evolved UMTS Terrestrial Radio Access Network).

The NR 202 is connected to a Next Generation Core Network (NGC) 204 and the LTE RAN 203 is connected to an LTE core network (Evolved Packet Core, EPC) 205. The NGC 204 and the EPC 205 are both connected to an IP (Internet Protocol) Multimedia Subsystem (IMS) 206.

When the UE 201 is camped on the next generation system (NGS) it may perform a fallback to the LTE communication system, also referred to as EPS (Evolved Packet System) in case of a multimedia call (which may be mobile originated or mobile terminated).

For example, the UE 201 needs to start a Mobile Originated (MO) call in 207 or receives a notification for an incoming Mobile Terminated (MT) call in 208.

According to indications received by the NGS, the UE performs signalling with the NGS in 209, which triggers a fallback of the UE to EPS in 210.

The UE 201 then performs the multimedia call in the EPS in 211.

It should be noted that procedures are specified for a fallback from EPS to 2G/3G and CS (circuit switched) core network, referred to as Circuit Switched Fallback (CSFB). For a MO call, the CSFB includes the UE receiving a fallback indication after CS service request, the UE fallback to 2G/3G and the UE initiating a CS service request as normal CS procedure. For a MT call, receiving an incoming call, the mobile switching station sends paging over an SG interface, the Mobility Management Entity (MME) triggers a fallback indication and the UE falls back to 2G/3G and sends a paging response to the Mobile Switching Center (MSC) as normal CS procedure.

In the following, approaches are described how to fallback from NGS to EPS for a UE that needs to perform a multimedia service. The architecture which is assumed in the following is, unless stated otherwise, as illustrated in FIG. 3.

Figure 3:
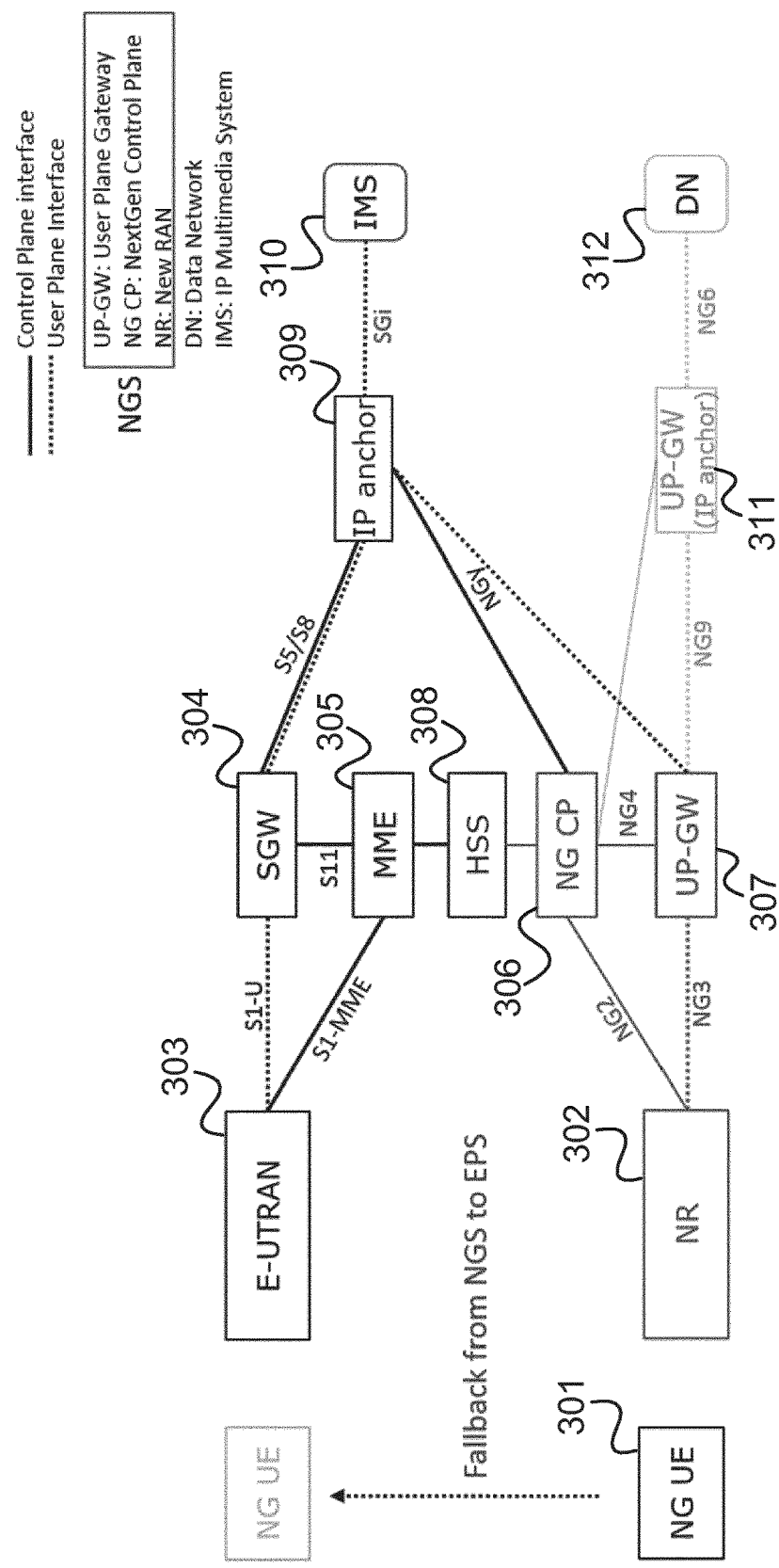
FIG. 3 shows a communication system.

FIG. 3 shows a communication system 300.

The communication system 300 comprises a UE 301 which is in the coverage area of a NR 302 and an E-UTRAN 303.

The E-UTRAN 303 is connected to a Serving Gateway (SGW) 304 and to a Mobility Management Entity (MME) 305 which are also connected to each other.

The NR 302 is connected to a Next Generation Control Plane (NG CP) 306, i.e. to entities and components implementing a NG CP, and to a User Plane Gateway (UP-GW) 307.

The communication system 300 comprises a common Home Subscriber Server (HSS) 308 to which the MME 305 and the NG CP 306 are connected.

The communication system 300 further comprises a common IP anchor 309 between the EPS and the NGS to which the NG CP 306, the UP-GW 307 and the SGW 304 are connected.

The common IP anchor 309 can be an EPC PGW, in this case the NGy interface between NGC and PGW is like EPC S5/S8 interfaces, a NGC UP-GW or a network element implementing the functions of both PGW and NGC UP-GW.

The IP anchor 309 is connected to an IMS 310.

The NG CP 306 and the UP-GW 307 may further be connected to another UP-GW 311 which provides connection to a data network (DN) 312.

It is further assumed that there is a common network attach between EPS and NGS, i.e. a UE attached to one of the EPS and the NGS is also attached to the other.

In the following, VoLTE service fallback for a NG UE connected to a NGS is described, wherein approaches for the following aspects are included:
1) Initial attach/registration: VoLTE capable UE registered with NGS are also registered to IMS in order to originate/receive VoLTE calls when needed
2) MO call: the NGC receives an Extended Service Request from the UE; the UE falls back to EPS to perform the VoLTE call; the procedure is controlled by the NGC and the UE returns to NGC when the call is terminated
3) MT call: the UE is paged by the NGS; thus, the UE sends an Extended Service Request, and falls back to the EPS.

Figure 4:
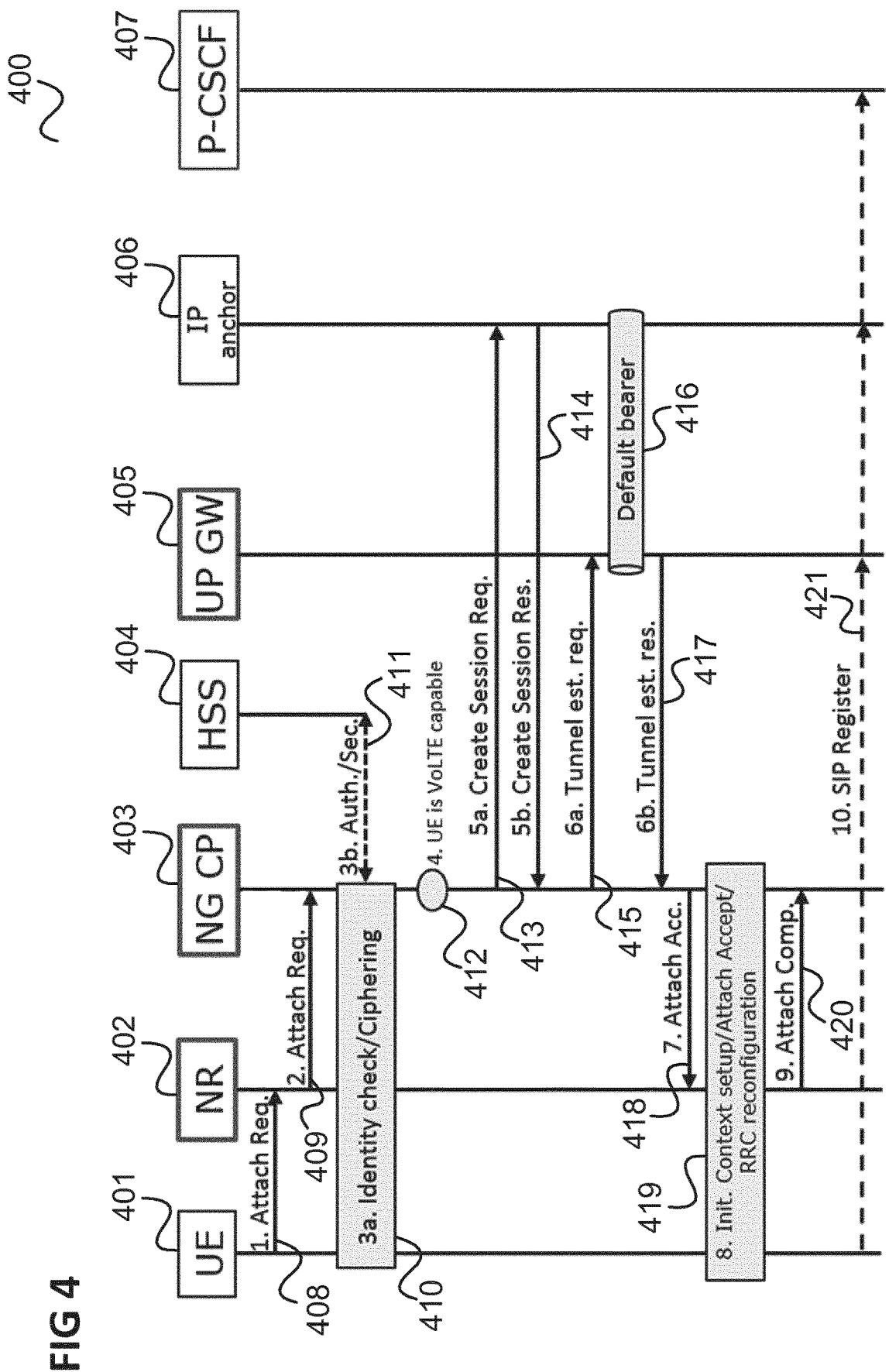
FIG. 4 shows a flow diagram illustrating an initial attach of a user equipment.

FIG. 4 shows a flow diagram 400 illustrating an NGC Initial attach of a VoLTE capable NG UE.

The flow takes place between a UE 401, for example corresponding to UE 301, a NR 402, for example corresponding to NR 302, a NG CP 403, for example corresponding to NG CP 306, an HSS 404, for example corresponding to HSS 308, an UP GW 405, for example corresponding to UP GW 307, an IP anchor 406, for example corresponding to IP anchor 309 and a P-CSCF 407, which is for example part of the IMS 310.

The procedure illustrated in FIG. 4 is similar to an E-UTRAN Initial Attach procedure, where the NG CP 403 performs the role of the MME and of the SM (Session Management) function in the SGW.

In 408, the UE 401 sends an Attach Request to request a PDN (Packet Data Network) session establishment and informs the network (i.e. NR 402) that the UE 401 is capable and configured to use VoLTE fallback.

In 409, the respective node of the NR 402 sends the Attach Request to the NG CP 403.

In 410, the NG CP 403 triggers an identity check and ciphering procedures with the UE 401.

In 411, the NG CP 403 triggers an Authorization and Security procedure with the HSS 404.

In 412, the NG CP 403 determines that the UE 401 is VoLTE capable.

In 413, the SM function of the NG CP 403 sends a Create Session Request to the IP anchor 406 to which the IP anchor 406 responds in 414.

In 415, the SM function of the NG CP 403 sends a Tunnel Establishment Request to the UP GW with the parameters to establish a default bearer 416 with the IP anchor 406 (NGy UP interface). The NG CP 403 creates the default bearer (PDN session) between the serving UP-GW 405 and the common IP anchor 406 and a PDU session in the NGC UP to enable receiving MT calls and responds in 417.

In 418, the NG CP 403 answers the Attach Request with an Attach Accept, indicating to the UE 401 whether IMS voice over PS Session is supported (IMSI_VOIP=True/False) and that VoLTE is supported by fallback to LTE (VoLTE_FB=True).

In 419, an Initial Context is set up, including the Attach Accept and RRC reconfiguration.

In 420, the NR 402 reports an Attach Complete to the NG CP 403.

In 421, the UE 401 starts the SIP registration procedure over the default bearer 416.

Figure 5:
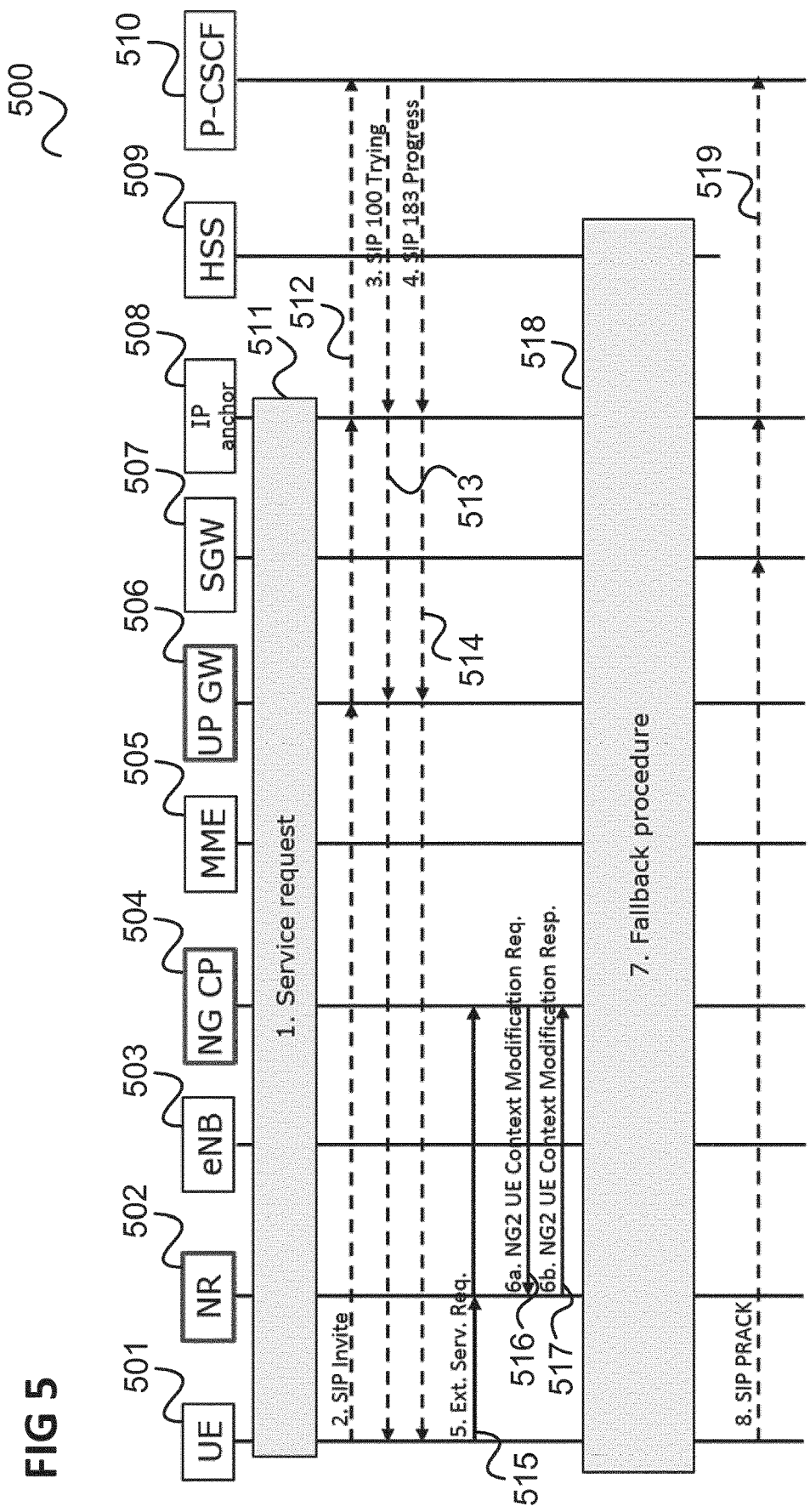
FIG. 5 shows a flow diagram illustrating a first example of the initiation of a fallback for a Mobile Originated call.

FIG. 5 shows a flow diagram 500 illustrating a first example of the initiation of a fallback for a Mobile Originated call.

The flow takes place between a UE 501, for example corresponding to UE 301, a NR 502, for example corresponding to NR 302, an LTE eNB 503, which is for example part of E-UTRAN 303, an NG CP 504, for example corresponding to NG CP 306, an MME 505, for example corresponding to MME 305, an UP GW 506, for example corresponding to UP GW 307, an SGW 507, for example corresponding to SGW 304, an IP anchor 508, for example corresponding to IP anchor 309, an HSS 509, for example corresponding to HSS 308, and a P-CSCF 510, which is for example part of the IMS 310.

It is assumed as a pre-requisite, that during the Attach procedure and Tracking Area Update procedures the NG CP 504 indicated to the UE 501 that:

IMS_VOIP=False and VoLTE_FB=True

IMS_VOIP=True and VoLTE_FB=True and that the operator policy or UE pre-configuration requires that the UE performs the voice call on LTE/EPC.

In 511, the VoLTE capable UE 501 performs a Service Request to initiate the signalling with P-CSCF 510.

In 512, the UE sends a SIP Invite message through the NGS network. The SIP Invite may be transmitted to another UE with which the UE 501 intends to establish a call.

In 513, the P-CSCF 510 sends a SIP 100 Trying message through the NGS network.

In 514, the P-CSCF 510 sends a SIP 183 Progress through the NGS network. The SIP 183 Progress may be transmitted from the other UE with which the UE 501 intends to establish a call.

In 515, the UE 501 sends an Extended Service Request for MO VoLTE fallback to the NG CP 504.

In 516, the NG CP 504 sends a NG2 UE Context Modification request (VoLTE Fallback indicator, TAI (Tracking Area Identity)) message to the NR 502. This message indicates to the NR 502 that the UE 501 should be moved to LTE.

In 517, the NR 502 sends a NG2 UE Context Modification response.

In 518, a fallback procedure is performed, e.g. based on a Handover or an RRC redirection as described further below.

In 519, the UE 501 sends a SIP PRACK message to the P-CSCF 510 through the EPS network.

In summary, the UE 501 sends a Service Request (SR) to exchange SIP Invite, Trying and Progress messages (in 511-514). Then, the UE 501 sends the ESR (in 515) and the NG CP 504 executes a fallback procedure to move the UE 501 to LTE/EPC.

The initiation of SIP signalling may thus be speed up by starting it on NGS.

Figure 6:
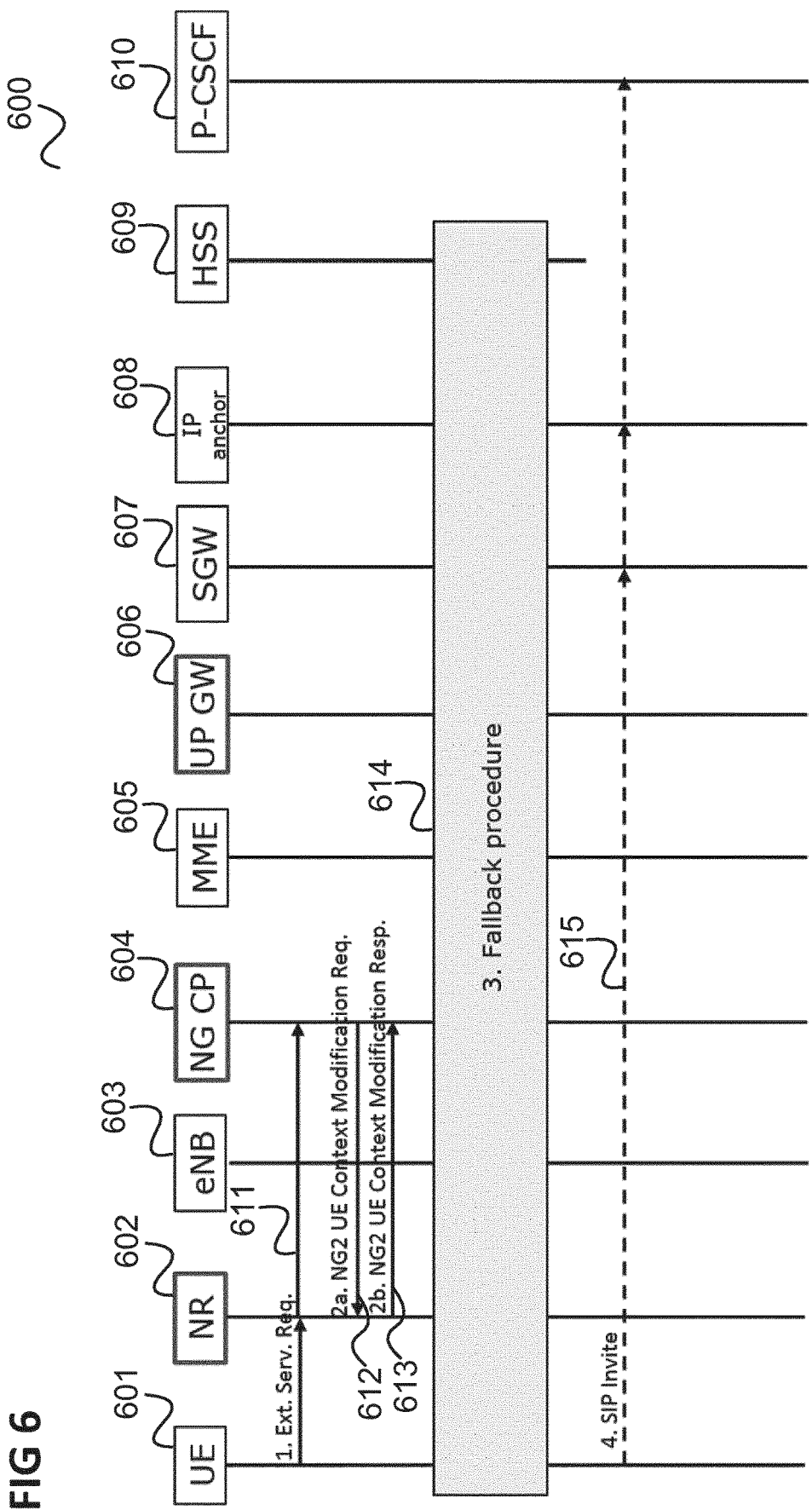
FIG. 6 shows a flow diagram illustrating a second example of the initiation of a fallback for a Mobile Originated call.

FIG. 6 shows a flow diagram 600 illustrating a second example of the initiation of a fallback for a Mobile Originated call.

The flow takes place between a UE 601, for example corresponding to UE 301, a NR 602, for example corresponding to NR 302, an LTE eNB 603, which is for example part of E-UTRAN 303, an NG CP 604, for example corresponding to NG CP 306, an MME 605, for example corresponding to MME 305, an UP GW 606, for example corresponding to UP GW 307, an SGW 607, for example corresponding to SGW 304, an IP anchor 608, for example corresponding to IP anchor 309, an HSS 609, for example corresponding to HSS 308, and a P-CSCF 610, which is for example part of the IMS 310.

It is assumed as a pre-requisite that during the Attach procedure and Tracking Area Update procedures the NG CP indicated to the UE that:

IMS_VOIP=False and VoLTE_FB=True

IMS_VOIP=True and VoLTE_FB=True and that the operator policy or UE pre-configuration requires that the UE performs the voice call on LTE/EPC.

611 and 613 are similar to 515 to 517 of the first example illustrated in FIG. 5.

In 614, a fallback procedure is performed e.g. based on a Handover or an RRC redirection as described further below.

In 615, the UE 601 sends a SIP Invite message to the P_CSCF 610.

In this example, SIP signalling is initiated after fallback which may lead to a safer procedure to avoid missing SIP signalling.

Figure 7:
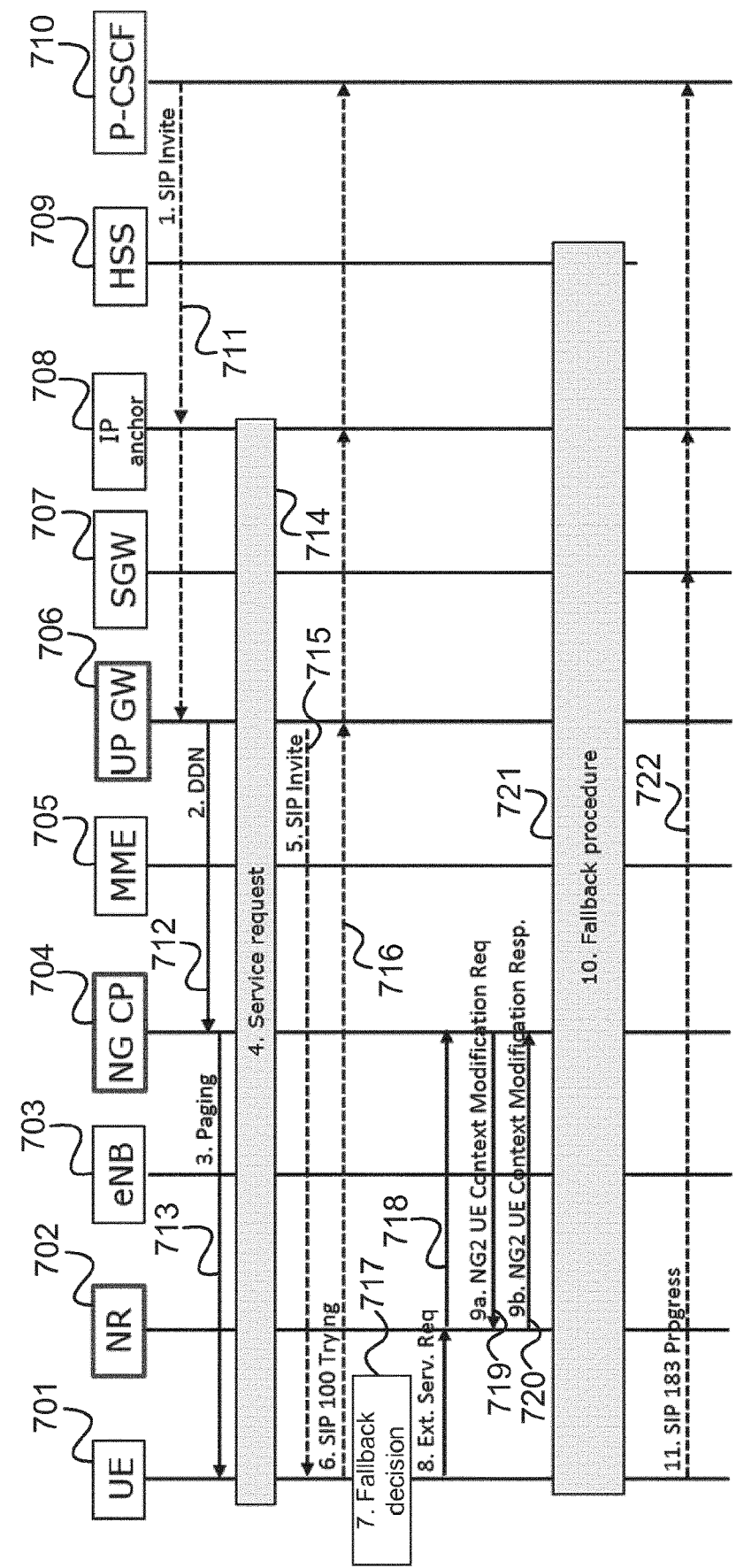
FIG. 7 shows a flow diagram illustrating a first example of the initiation of a fallback for a Mobile Terminated call.

FIG. 7 shows a flow diagram 700 illustrating a first example of the initiation of a fallback for a Mobile Terminated call.

The flow takes place between a UE 701, for example corresponding to UE 301, a NR 702, for example corresponding to NR 302, an LTE eNB 703, which is for example part of E-UTRAN 303, an NG CP 704, for example corresponding to NG CP 306, an MME 705, for example corresponding to MME 305, an UP GW 706, for example corresponding to UP GW 307, an SGW 707, for example corresponding to SGW 304, an IP anchor 708, for example corresponding to IP anchor 309, an HSS 709, for example corresponding to HSS 308, and a P-CSCF 710, which is for example part of the IMS 310.

It is assumed as a pre-requisite that during the Attach procedure and Tracking Area Update procedures the NG CP indicated to the UE that:

IMS_VOIP=False and VoLTE_FB=True

IMS_VOIP=True and VoLTE_FB=True and the operator policy or UE pre-configuration requires that the UE performs the voice call on LTE/EPC.

In 711, the P-CSCF 710 sends a SIP Invite to the IP anchor 708 and the IP anchor 708 forwards it to the UP-GW 706 through the default bearer. The SIP Invite may originate from another UE which intends to establish a call with the UE 701.

In 712, the UP-GW 706 sends a Downlink Data Notification to the NG CP 704.

In 713, the NG CP 704 performs a paging of the UE 701.

In 714, the UE 701 performs a Service Request as a response to the paging.

In 715, the UE 701 receives the SIP Invite through the NGS network.

In 716, the UE 701 sends a SIP 100 Trying to the P-CSCF 710.

In 717, based on the value of the indicators IMS VOIP and VoLTE_FB, the UE 701 performs the fallback decision.

718-721 are similar to 515 to 518 of the example illustrated in FIG. 5.

In 722, the UE 701 sends a SIP 183 Progress message through the NGS.

In summary, in case of an incoming MT call, the UE 701 receives the SIP Invite via the common IP anchor 708 and the UP-GW 706 (in 711-715). After sending the SIP Trying, the UE 701 performs an Extended Service Request (in 708) and the NG CP 704 executes the fallback procedure to move the UE 701 to LTE/EPC like for the case of an MO call (e.g. as in the example of FIG. 5). The UE 701 then sends a SIP 183 Progress via LTE/EPC.

This procedure involves a Service Request to exchange SIP signalling with the IMS or the other UE, respectively, followed by Extended Service Request to request the fallback.

Figure 8:
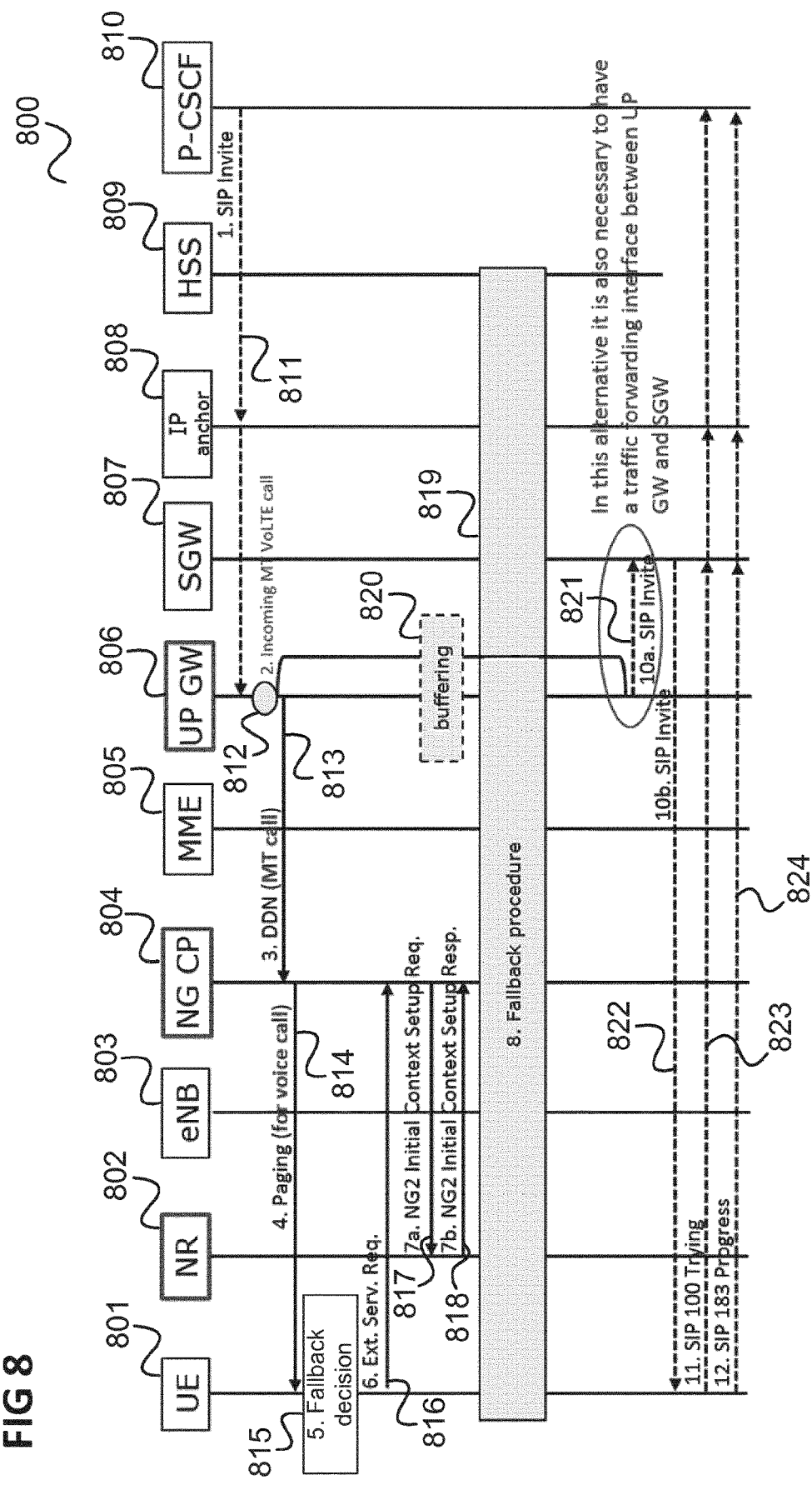
FIG. 8 shows a flow diagram illustrating a second example of the initiation of a fallback for a Mobile Terminated call.

FIG. 8 shows a flow diagram 800 illustrating a second example of the initiation of a fallback for a Mobile Terminated call.

The flow takes place between a UE 801, for example corresponding to UE 301, a NR 802, for example corresponding to NR 302, an LTE eNB 803, which is for example part of E-UTRAN 303, an NG CP 804, for example corresponding to NG CP 306, an MME 805, for example corresponding to MME 305, an UP GW 806, for example corresponding to UP GW 307, an SGW 807, for example corresponding to SGW 304, an IP anchor 808, for example corresponding to IP anchor 309, an HSS 809, for example corresponding to HSS 308, and a P-CSCF 810, which is for example part of the IMS 310.

It is assumed as a pre-requisite that during the Attach procedure and Tracking Area Update procedures the NG CP indicated to the UE that:

IMS_VOIP=False and VoLTE_FB=True

IMS_VOIP=True and VoLTE_FB=True and that the operator policy or UE pre-configuration requires that the UE performs the voice call on LTE/EPC.

In 811, the P-CSCF 810 sends a SIP Invite to the i.e. IP anchor 808. The IP anchor 808 forwards it to the UP-GW 806 through the default bearer.

In 812, the UP GW 806 detects that data come from the default bearer established with the IP anchor 806 for IMS traffic.

In 813, the UP-GW 806 sends a Downlink Data Notification to the NG CP 804 with an MT call indication.

In 814, the NG CP 804 performs a paging with a "for voice call" indication.

815-818 are similar to 717 to 720 of the example of FIG. 7.

In 819, a fallback procedure is carried out. The fallback procedure triggers the establishment of a tunnel between UP-GW 806 and SGW 807.

In 820, the SIP Invite is buffered by the UP-GW 806, in 821 forwarded to the SGW 807 and in 822 forwarded from the SGW 807 to the UE 801.

In 823 the UE 801 sends a SIP 100 Trying message and in 824 a SIP 183 Progress message to the P-CSCF 810 through the EPS UP.

In summary, in case of an incoming MT call, the UP-GW 806 detects data on the default bearer (in 812) established for receiving SIP signalling and reports (in 813) a Downlink Data Notification to the NG CP 804 with "MT call" indication. The NG CP 804 pages (in 814) the UE 801 with a "for voice call" indication and the UE 801 performs an Extended Service Request.

In contrast to the first example illustrated in FIG. 7, the approach of the second example of FIG. 8 requires a direct interface between UP GW 806 and SGW 807 to forward SIP signalling after the fallback procedure.

Figure 9:
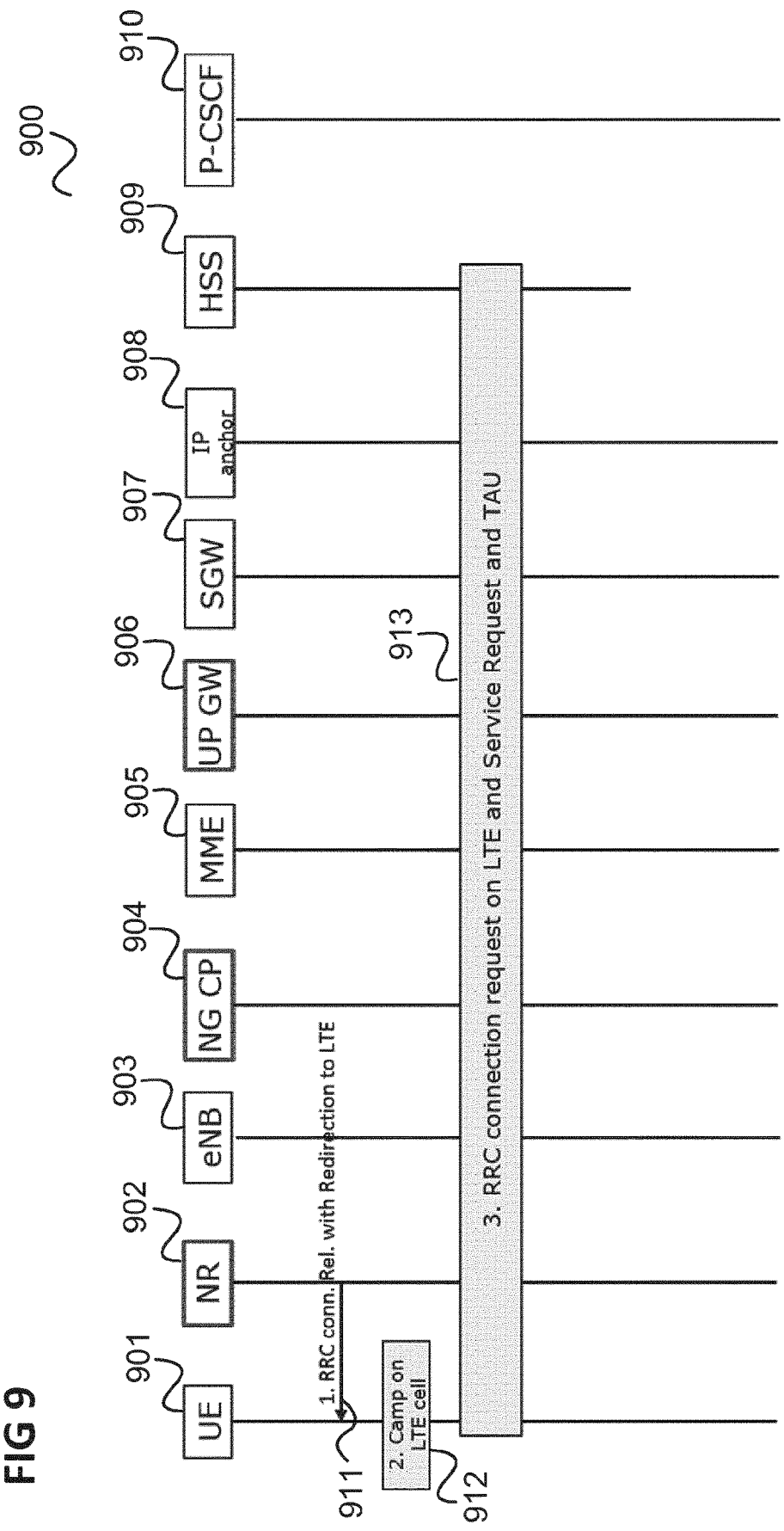
FIG. 9 shows a flow diagram illustrating a fallback procedure with RRC redirection.

FIG. 9 shows a flow diagram 900 illustrating a fallback procedure with RRC redirection.

The flow takes place between a UE 901, for example corresponding to UE 301, a NR 902, for example corresponding to NR 302, an LTE eNB 903, which is for example part of E-UTRAN 303, an NG CP 904, for example corresponding to NG CP 306, an MME 905, for example corresponding to MME 305, an UP GW 906, for example corresponding to UP GW 307, an SGW 907, for example corresponding to SGW 304, an IP anchor 908, for example corresponding to IP anchor 309, an HSS 909, for example corresponding to HSS 308, and a P-CSCF 910, which is for example part of the IMS 310.

In 911, a redirection procedure (e.g. according to 3GPP) is performed. The UE context is not released.

In 912, the UE 901 camps on a LTE cell.

In 913, the UE 901 sends an RRC connection request on LTE and a Service Request. The UE 901 includes in the Service Request an indication that the SR is due to fallback. Further, a tracking area update (TAU) is performed.

In case of the example of FIG. 8, the TAU also triggers the establishment of the tunnel between UP-GW and SGW.

Figure 10:
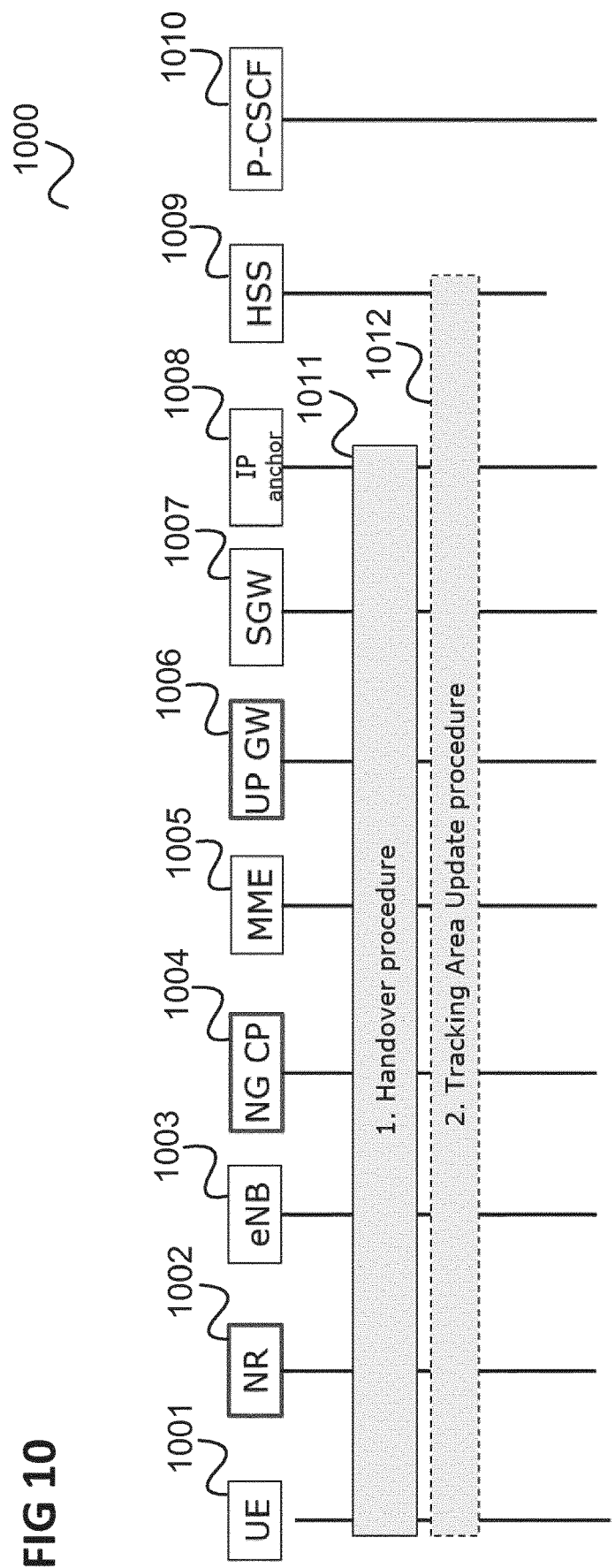
FIG. 10 shows a flow diagram illustrating another example of a fallback procedure with handover.

FIG. 10 shows a flow diagram 1000 illustrating another example of a fallback procedure with handover.

The flow takes place between a UE 1001, for example corresponding to UE 301, a NR 1002, for example corresponding to NR 302, an LTE eNB 1003, which is for example part of E-UTRAN 303, an NG CP 1004, for example corresponding to NG CP 306, an MME 1005, for example corresponding to MME 305, an UP GW 1006, for example corresponding to UP GW 307, an SGW 1007, for example corresponding to SGW 304, an IP anchor 1008, for example corresponding to IP anchor 309, an HSS 1009, for example corresponding to HSS 308, and a P-CSCF 1010, which is for example part of the IMS 310.

In 1011, a handover procedure is carried out, e.g. similar to an S1 based Handover in EPC according to 3GPP, where the NG CP 1104 has the role of source MME and the CP part of the source SGW. The security context is moved from the source to target Control Plane function (MME) via an S10 interface which is provided in addition (with respect to the architecture shown in FIG. 3) between the MME 1005 and the NG CP 1004 to support the handover.

In 1012, optionally, a Tracking Area Update with the EPC is carried out.

The procedures of FIGS. 9 and 10 are only examples and the fallback procedure may also be implemented differently. In comparison with the example of FIG. 9, the example of FIG. 10 requires an interworking interface between MME and NG CP to support the handover between NGS and EPS.

After call clearing (MT or MO), after a SIP BYE message, the PDN session may be moved back to the NGS. This may for example involve the following:

The MME 305 gets an indication from UE 301 that the Service Request is due to fallback of multimedia call The eNB (e.g. part of E-UTRAN 303) indicates a release of the S1 due to inactivity, the MME 305 reminds the UE 301 that it must be redirected back to the NGS The MME 305 releases the S1 with redirect indication The eNB releases the RRC with redirection to 5G.

The UE 301 may implement a logic to determine which procedure to perform in case of a MO or MT call which may follow table 1 below. The decision is based on the parameters received from the NG CP during initial attach and TAU:

IMS_VOIP: IMS voice over PS session is supported

VoLTE_FB: the VoLTE is supported by fallback to LTE.

TABLE 1

| Parameter Values | Decision |
|---|---|
| IMS_VOIP = True<br>VoLTE_FB = True | The UE performs the voice call either on EPS by VoLTE FB or on NGS depending on the operator policy, or UE pre-configuration |
| IMS_VOIP = True<br>VoLTE_FB = False | The UE performs the voice call on NGS |
| IMS_VOIP = False<br>VoLTE_FB = True | The UE performs the voice call on EPS |
| IMS_VOIP = False<br>VoLTE_FB = False | No voice service is available. UE does not perform IMS registration. |

Figure 11:
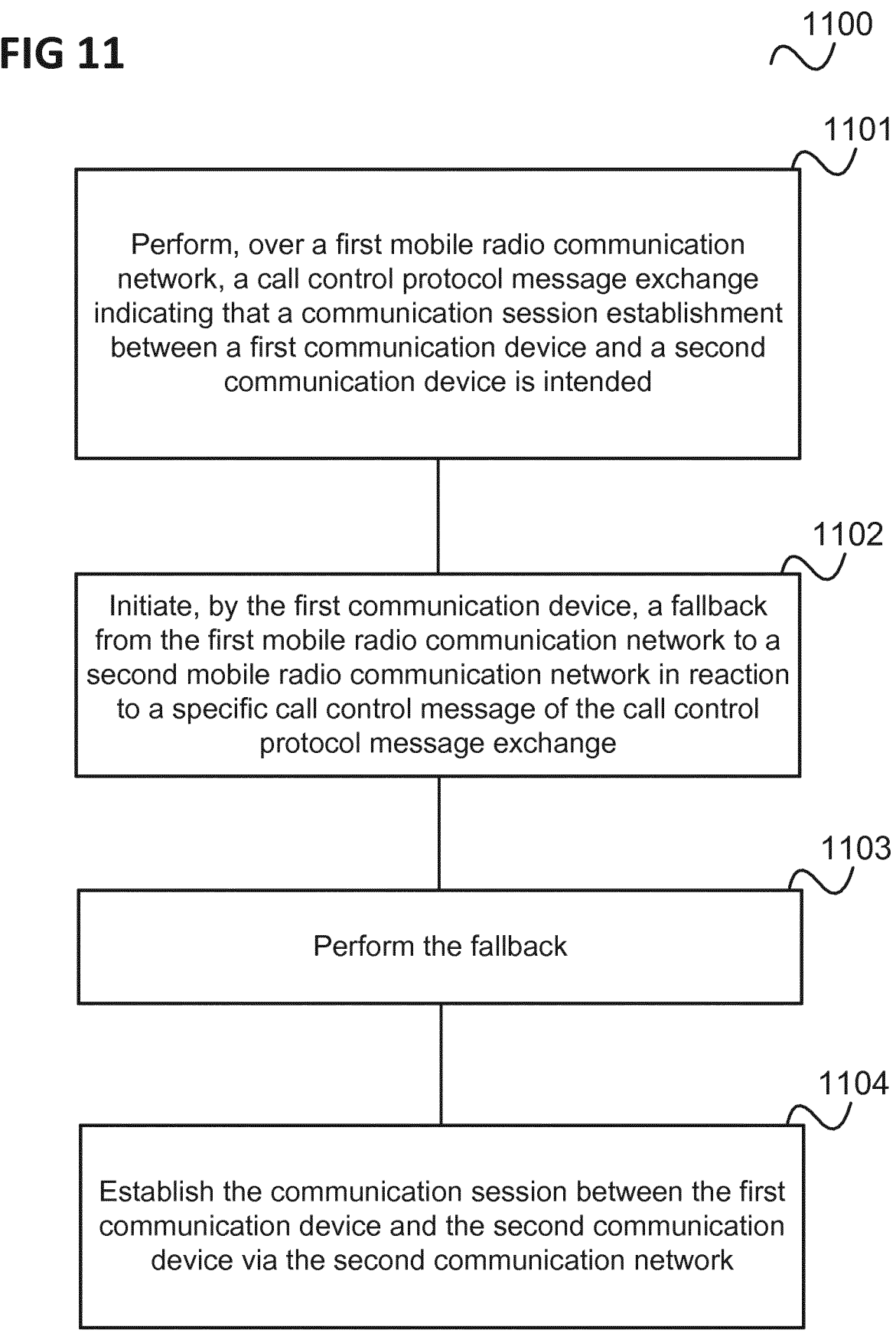
FIG. 11 shows a flow diagram illustrating a method for establishing a communication.

In summary, according to various embodiments (such as illustrated in FIGS. 5 and 7), a method for establishing a communication is provided as illustrated in FIG. 11.

FIG. 11 shows a flow diagram 1100.

In 1101 a call control protocol message exchanged (e.g. comprising one or more call control protocol messages) is performed over a first mobile radio communication network indicating that a communication session establishment between a first communication device and a second communication device is intended.

In 1102, the first communication device initiates a fallback from the first mobile radio communication network to a second communication network in reaction to a specific call control protocol message of the call control protocol message exchange.

In 1103, the fallback is performed.

In 1104, the communication session between the first communication device and the second communication device is established via the second mobile radio communication network.

According to various embodiments, in other words, an initial call establishment signalling exchange (according to a call control protocol such as SIP) is performed over a first network before a fallback to a second network is initiated. The fallback is initiated in reaction to a specific call control protocol message of the call control protocol message exchange, e.g. to the sending or receiving of a specific call control protocol message by one of the communication devices. This may for example be the last message of the message exchange. The specific message may for example indicate that a call establishment is in progress (e.g. may be a SIP 183 Progress message) or may be a message that acknowledges the receipt of an invitation to the communication session (e.g. may acknowledge the receipt of an invitation originating from one of the communication devices, e.g. terminals, in the network, e.g. in the IMS, for example a SIP Trying message). The signalling exchange may for example over the first network go at least to a point where at least one message has been exchanged between the communication parties, or, in other words, to a point where both communication parties have been informed that a session (e.g. call) establishment is intended. In other words, the message exchange performed before the fallback may involve an end-to-end transmission of a call control protocol message (such as a SIP invite message or a SIP 183 progress message). The call control protocol may be understood as an application layer protocol (according to the OSI (Open System Interconnection) reference model). In other words, the message exchange is a message exchange on application layer.

For example, in case of a next generation system and an LTE system as fallback system, for a mobile originated call, there is an initial exchange of SIP signalling through the NGC user plane before the Extended Service Request by the mobile terminal. Similarly, for a mobile terminated call, the mobile terminal receives SIP signalling in the system where it resides (e.g. an NGS) and then the UE sends an Extended Service Request.

Figure 12:
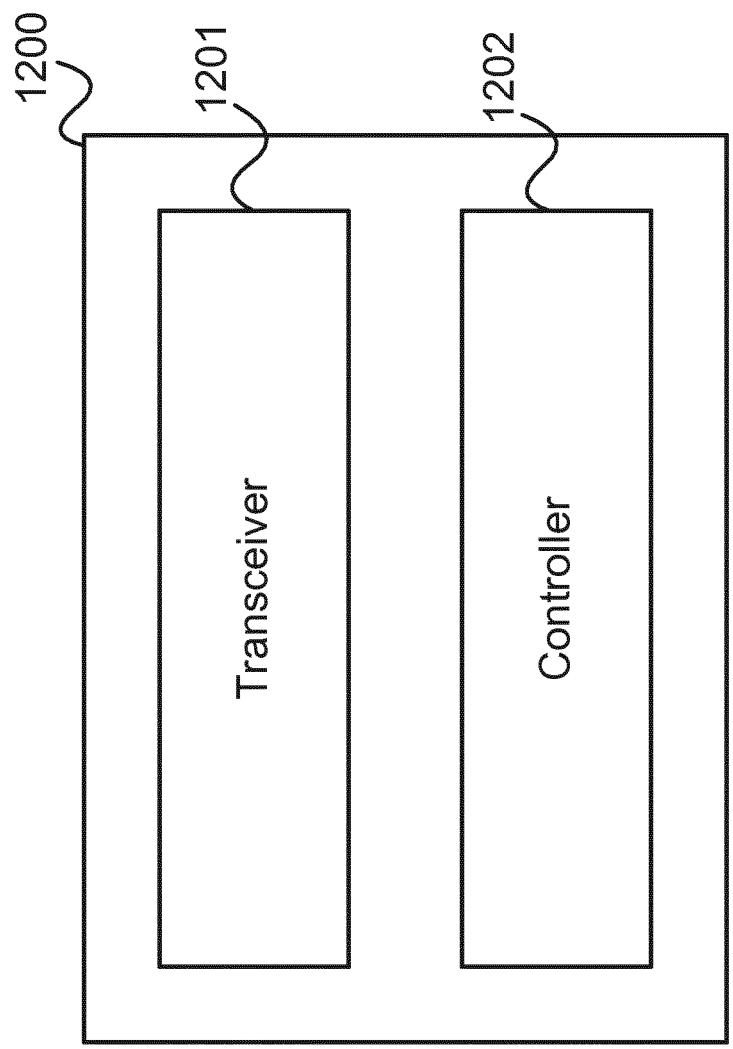
FIG. 12 shows a communication device according to an embodiment.

The method illustrated in FIG. 11 is for example carried out by a communication device as illustrated in FIG. 12.

FIG. 12 shows a communication device 1200 according to an embodiment.

The communication device 1200 comprises a transceiver 1201 configured to exchange, over a first communication network, a message with a second communication device indicating that a communication session establishment between the first communication device and the second communication device is intended.

The communication device 1200 further comprises a controller 1202 configured to perform, after the call control protocol message exchange, a fallback from the first communication network to the second communication network.

The transceiver 1201 is configured to establish the communication session between the first communication device and the second communication device via the second communication network.

It should be noted that one or more of the steps of the method illustrated in FIG. 11 may be carried out by a communication network component, i.e. a communication network component may be provided configured to carry out one or more of the steps of the method of FIG. 11.

The approaches described above may for example be used by a network operator to implement fallback strategies of multimedia services from NGS to EPS as a transitory solution during the deployment of a New RAN and NextGen Core network. This may allow providing good quality multimedia services in a transitory situation of rollout of the Next Generation System.

A fallback may for example be performed
To avoid frequent handovers in case of discontinuous NR coverage
Before and during the rollout of features to support multimedia calls on NGS The approaches according to embodiments as described above may be implemented using a loosely coupled system.

Various examples are described below:

Example 1 is a method for establishing a communication as illustrated in FIG. 11.

Example 2 is the method according to Example 1, wherein the first mobile radio communication network is a 5G mobile radio communication network and the second mobile radio communication network is a Long Term Evolution radio communication network.

Example 3 is the method according to Example 1 or 2, wherein the call control protocol is an application layer protocol.

Example 4 is the method according to any one of Examples 1 to 3, wherein the call control protocol message exchange comprises the transmission of an invitation message to a communication session from the first communication device to the second communication device.

Example 5 is the method according to any one of Examples 1 to 4, wherein the call control protocol message exchange comprises the transmission from the second communication device to the first communication device of a response message to an invitation to a communication session by the first communication device.

Example 6 is the method according to any one of Examples 1 to 5, wherein the communication session is a multimedia call.

Example 7 is the method according to any one of Examples 1 to 6, wherein the communication session is an Internet Protocol Multimedia Subsystem communication session.

Example 8 is the method according to Example 7, wherein the initiation of the fallback by the first communication device comprising sending an extended service request to the first mobile radio communication network.

Example 9 is the method according to any one of Examples 1 to 8, comprising the first mobile radio communication network transmitting to the first communication device an indication that a fallback to the second mobile radio communication network is supported and comprising the first communication device initiating the fallback based on the indication.

Example 10 is the method according to any one of Examples 1 to 9, wherein the fallback comprises changing a communication path between the first communication device and the second communication device from going via the first mobile radio communication network to going via the second mobile radio communication network.

Example 11 is the method according to any one of Examples 1 to 10, wherein the message exchange is a message exchange between the first communication device and the second communication device.

Example 12 is the method according to any one of Examples 1 to 11, wherein the specific message of the call control protocol message exchange indicates that the communication session establishment between the first communication device and the second communication device is in progress.

Example 13 is the method according to any one of Examples 1 to 10, wherein the specific message of the call control protocol message exchange acknowledges the reception of an invitation to the communication session.

Example 14 is a communication device as illustrated in FIG. 12.

Figure 13:
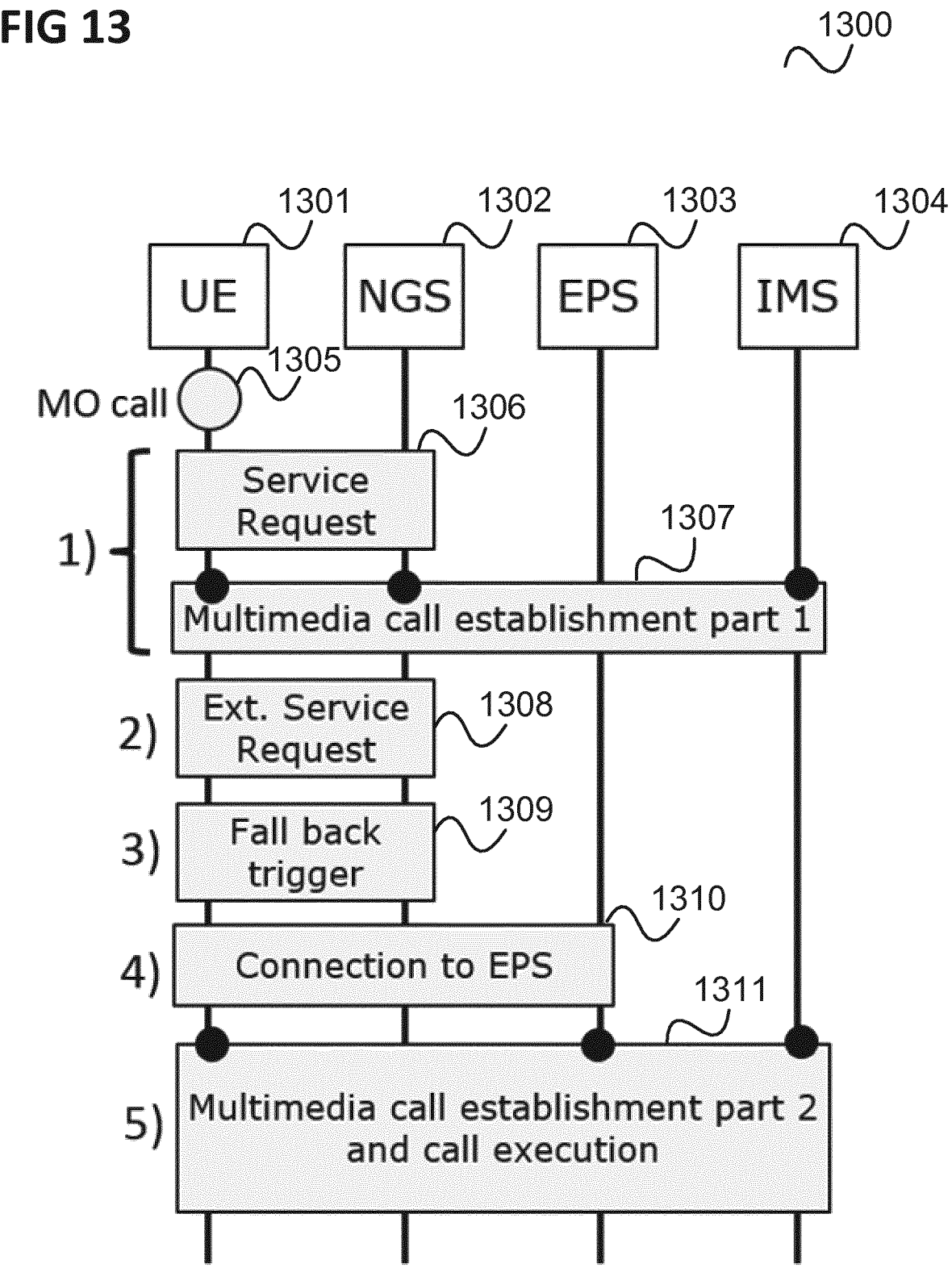
FIG. 13 shows a message flow diagram illustrating a method for establishing a mobile originated multimedia call.

A further example is illustrated in FIG. 13.

FIG. 13 shows a message flow diagram 1300 illustrating a method for establishing a mobile originated multimedia call.

The message flow takes place between a UE 1301, a first mobile network (e.g. a NGS) 1302, a second mobile network (e.g. an EPS) 1303 and an IP multimedia (sub-)system 1304.

In 1305, the UE 1301 decides (e.g. in response to a user input) to perform a multimedia call.

In 1306, the UE 1301 originates a service request in the first mobile network 1302 to exchange, in 1307, initial call establishment signalling with the IP multimedia system 1304.

In 1308, the UE 1301 originates a second service request in the first mobile network 1302 to request the transfer of the multimedia call to the second mobile network 1303.

In 1309, the first mobile network 1302 triggers the transfer of the user equipment 1301 to the second mobile network 1303.

In 1310, the user equipment 1301 connects to the second mobile network 1303 and sends a service request to the second mobile network 1303.

In 1311, the user equipment 1301 completes the call establishment signalling with the IP multimedia system and executes the multimedia call.

A further example is illustrated in FIG. 14.

FIG. 14 shows a message flow diagram 1400 illustrating a method for establishing a mobile terminated multimedia call.

The message flow takes place between a UE 1401, a first mobile network (e.g. a NGS) 1402, a second mobile network (e.g. an EPS) 1403 and an IP multimedia (sub-)system 1404.

In 1405, the IP multimedia system 1404 originates a mobile terminated call notification to the user equipment 1401 connected to the first mobile network 1402 and the first mobile network 1402 generates a paging to the user equipment 1401.

In 1406, the user equipment 1401 originates a service request in the first mobile network 1402 to exchange, in 1407, initial call establishment signalling with the IP multimedia system 1404.

In 1408, the user equipment 1401 originates a second service request in the first mobile network 1402 to request the transfer of the multimedia call to the second mobile network 1403.

In 1409, the first mobile network 1402 triggers the transfer of the user equipment 1401 to the second mobile network 1403.

In 1410, the user equipment 1401 connects to the second mobile network 1403 and sends a service request to the second mobile network 1403.

In 1411, the user equipment 1401 completes the call establishment signalling with the IP multimedia system 1404 and executes the multimedia call.

In the examples of FIGS. 13 and 14 the user equipment may indicate in the service request to the second mobile network that the service request is due to perform a multimedia call with said IP multimedia system and, at the termination of the multimedia call, the second mobile network may release the connection to the user equipment and the user equipment may perform a new connection to said first mobile network.

It should be noted that embodiments and examples described in context of one of the methods are analogously valid and applicable to the other methods as well as the communication device and vice versa.

The components of the communication device (e.g. the transceiver and the controller) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A method for establishing a communication comprising:
    performing, via components of a first mobile radio communication network, a call control protocol message exchange indicating that a communication session establishment between a first communication device and a second communication device is intended;
    the first communication device initiating a fallback from the first mobile radio communication network to a second mobile radio communication network, in a case where a component of the first mobile radio communication network transmits to the first communication device an indication that a service over the communication session is supported by the fallback from the first mobile radio communication network to the second mobile radio communication network and sending or receiving of a specific call control message of the call control protocol message exchange by the first communication device or the second communication device is performed;
    performing the fallback; and
    establishing the communication session between the first communication device and the second communication device via the second mobile radio communication network.

2. The method according to claim 1, wherein the first mobile radio communication network is a 5G mobile radio communication network and the second mobile radio communication network is a Long Term Evolution radio communication network.

3. The method according to claim 1, wherein the call control protocol is an application layer protocol.

4. The method according to claim 1, wherein the call control protocol message exchange comprises the transmission of an invitation message to a communication session from the first communication device to the second communication device.

5. The method according to claim 1, wherein the call control protocol message exchange comprises the transmission from the second communication device to the first communication device of a response message to an invitation to a communication session by the first communication device.

6. The method according to claim 1, wherein the communication session is a multimedia call.

7. The method according to claim 1, wherein the communication session is an Internet Protocol Multimedia Subsystem communication session.

8. The method according to claim 7, wherein the initiation of the fallback by the first communication device comprises sending an extended service request to the first mobile radio communication network.

9. The method according to claim 1, wherein the fallback comprises changing a communication path between the first communication device and the second communication device from going via the first mobile radio communication network to going via the second mobile radio communication network.

10. The method according to claim 1, wherein the message exchange is a message exchange between the first communication device and the second communication device.

11. The method according to claim 1, wherein the specific message of the call control protocol message exchange indicates that the communication session establishment between the first communication device and the second communication device is in progress.

12. The method according to claim 1, wherein the specific message of the call control protocol message exchange acknowledges the reception of an invitation to the communication session.

13. A communication device comprising:

a transceiver configured to exchange, via components of a first mobile radio communication network, one or more call control protocol messages indicating that a communication session establishment between the communication device and a second communication device is intended; and a controller configured to initiate a fallback from the first mobile radio communication network to a second mobile radio communication network, in a case where a component of the first mobile radio communication network transmits to the communication device an indication that a service over the communication session is supported by the fallback from the first mobile radio communication network to the second mobile radio communication network and sending or receiving of a specific call control message of the one or more call control protocol messages by the transceiver is performed, and wherein the transceiver is configured to perform the fallback and to establish the communication session between the communication device and the second communication device via the second mobile radio communication network.

* * * * *